Oct. 20, 1936. W. McQUADE 2,058,167
METHOD OF MAKING A STRUCTURAL UNIT
Filed April 26, 1932 2 Sheets-Sheet 1
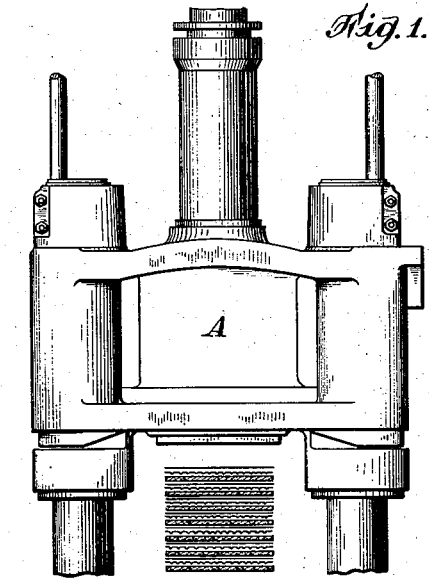
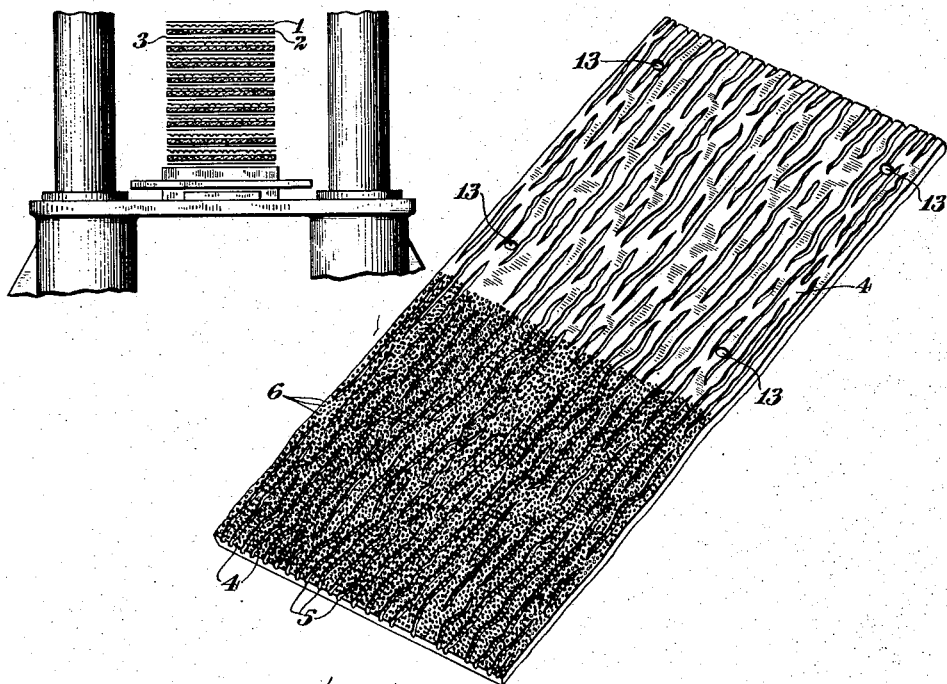
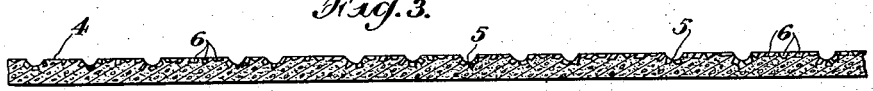
INVENTOR
Walter McQuade
BY
ATTORNEY Oct. 20, 1936.   W. McQUADE   2,058,167
METHOD OF MAKING A STRUCTURAL UNIT
Filed April 26, 1932   2 Sheets-Sheet 2
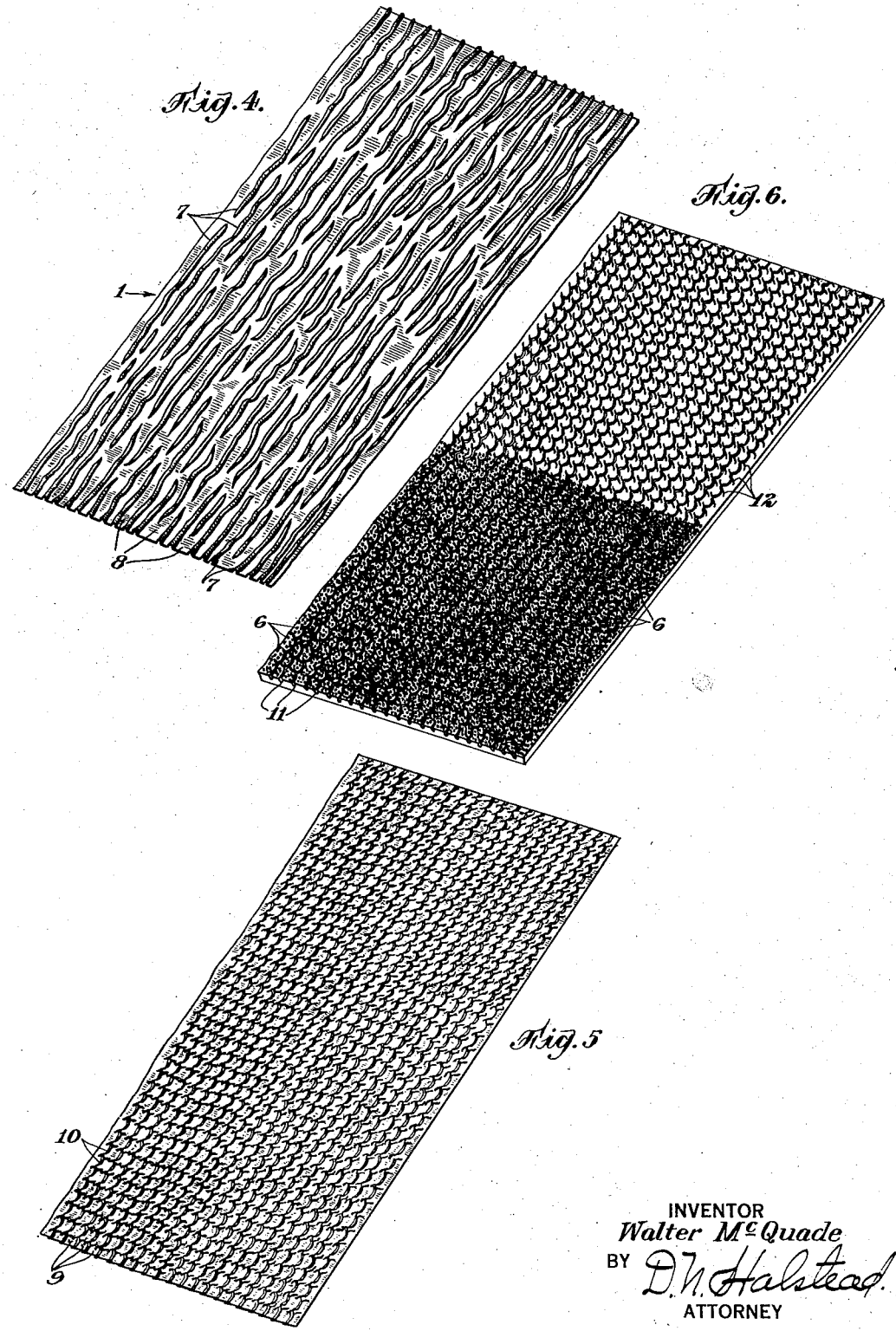
INVENTOR
Walter McQuade
BY D.N. Halstead
ATTORNEY Patented Oct. 20, 1936

2,058,167

UNITED STATES PATENT OFFICE 2,058,167

METHOD OF MAKING A STRUCTURAL UNIT

Walter McQuade, Port Washington, N. Y., assignor to Johns-Manville Corporation, New York, N. Y., a corporation of New York Application April 26, 1932, Serial No. 607,533

1 Claim. (Cl. 25—154)

This invention relates to a unit of structural material of uneven surface, particularly a rigid shingle with a grooved or grained surface, and a method of making the same. The invention pertains especially to making such shingles from a composition, such as one containing a hydraulic cementitious material and asbestos fibers, that is plastic or readily deformable at one stage of the process of manufacturing the shingles.

A typical process involves forming irregularities or depressions in a surface of the material while it is being densified by compression. Such irregularities may be made, for example, by impressing a molding (deformed) metal plate upon the surface of a sheet of deformable material.

Rigid shingles prepared from a mixture of Portland cement and asbestos fibers, either in presses or by machine of a type and a process similar to that described in U. S. Patent 979,548 to Norton, dated December 27, 1910, are illustrative of the products and materials to which the invention has been successfully applied, and the invention is specifically described hereinafter with reference to such products. Such shingles may contain various proportions of Portland cement to short asbestos fibers, as, for example, 1.7 to 2.2, suitably 1.9, parts by weight of the cement to 1 part of asbestos.

My improved products, as well as a method of producing them, are illustrated in the accompanying drawings in which Fig. 1 is a side elevation of a stack of deformable sheets, craped plates, and plates of smooth surface, before compression in an hydraulic press.

Fig. 2 is a perspective view of an asbestos shingle embodying my invention and showing the presence of a colored coating on that end of the shingle that is to be exposed to view in a finished assembly, such as a roof.

Fig. 3 is an enlarged transverse section through the exposure end of the shingle.

Fig. 4 is a perspective view of a craped or ridged tin plate suitable for use in obtaining a wood-grain effect in molding the shingle.

Fig. 5 is a perspective view of a piece of cross-ridged metal plate such as can be used in molding the shingle to obtain a textile effect on its surface.

Fig. 6 shows a perspective view of a modified shingle provided with both longitudinal and transverse depressions, such as made by impressing the cross-ridged plate illustrated in Fig. 5 upon a surface of a deformable sheet.

In the various figures, like reference characters denote like parts.

There is first made a flat, deformable crumbly sheet of a binder, suitably a hydraulic cementitious material, and a fibrous reenforcing material. Thus a mixture of Portland cement and asbestos fibers, for example, is made into a sheet. The sheet is wetted with a spray of water, to give a wet plastic or deformable sheet, and then cut into shingle segments, all as described, for example, in the said patent to Norton. The segments may contain admixed coloring material, such as lamp black, for example, and/or a veneer of coloring materials, such as pigments adhered to a face of the shingle by means of a cementitious material. Thus a veneer of Portland cement and burnt umber, chrome green, yellow oxide, and/or the like, may be applied to the top surface of the band or sheet of the mixture of the other shingle ingredients, wetted with a spray of water, and firmly adhered to the said band or sheet, as by subsequent pressing and hardening operations. Further, a surface coating of colored material, such as granular colored slate or tile, may be sprinkled over the top surface and welded thereto by subsequent pressing and hardening.

The segments of shingle stock are then stacked up vertically, preparatory to densification by compression in an hydraulic press, indicated generally at A, in Fig. 1. However, a departure is made from the conventional manner of pressing. In the conventional manner of pressing, the segments are pressed with metal plates of plane surface on each side of each segment. In the modification of this process in accordance with the present invention, a flexible plate 1 of irregular or craped surface is placed on one side of the segment 2, that is, between one face, suitably the upper face, of each segment and a face of the adjacent metal plate 3 of plane surface. The craped plate has elevations 7 and flat portions 8.

When such an assembly is submitted to strong hydraulic pressure, say 14,000 pounds to the square inch, there results not only the usual densification of the material in the segments, but also the simultaneous production of irregularities on one surface of each segment. For example, the segment comes to have, on the one surface, grooves or irregularities that are the negative of the pattern of the craped plate which, during the pressing, was adjacent to that surface, including plane or flat portions 4 and depressions 5. Granular colored tile, if spread over the surface of the segment before it is placed in the stack, remains on the irregular surface, embedded therein, as indicated at 6.

After the pressing operation is completed the stack is removed from the press and is allowed to stand for several hours, during which time the Portland cement in the shingle composition takes an initial set. After this initial hardening the stack is disassembled by separating the metal plates from the segments of shingle material. The segments are then re-stacked without any particular protection of the irregularities of surface and are hardened, that is, allowed to stand until the cement in them has taken the final set, as, for example, for a period of about a month.

The shingles are then finished in a usual manner. Thus they may be trimmed to exact size desired for the finished shingle and perforated, as at positions 13, to facilitate the insertion of fastening members when the shingles are used in a roof assembly.

It has been found that craped, flexible metal sheets, or embossing plates, may be used in making a large number of pressings of shingle segments. In some cases such plates have been used repeatedly, as, for example, from 50 to 100 or more times. During such use the embossing plates become gradually flattened, with consequent modification of the design which they impart to the shingle material. This gradual change in design is a feature of advantage, as it increases the dissimilarity of the various resulting shingles and makes possible the economical production of shingles which have individual irregularities of surface and which have also differences between each other. Also, the ridged plates are appreciably and resiliently flattened during the pressing operation. When the pressure is released there is return, in large part at least, of the plates to their original forms. As a result, the ridges in the plates, at the time of removal from the impressed sheet, are of smaller width than the grooves in which they are severally disposed and which correspond generally to the maximum width of the ridges in the appreciably flattened condition. Thus, there is facilitated removal of the plates from material that might otherwise be torn or crumbled.

Shingles so made have additional features. Thus, the shingles so made have a plane surface that is longitudinally grained or grooved in close simulation of the appearance of a wooden shingle, which avoids the objectionable light-reflecting qualities of a flat surfaced asbestos shingle. At the same time, the irregularities of surface are provided in such manner that there is no repetition of "accidental" effects. The shingles can be produced at practically the same cost as an ordinary asbestos shingle. The surface of the shingles, while irregular, is not broken, but is continuous, with consequent retention of its inherent degree of impermeability to water, and strength. The irregularities of surface can be had in conjunction with the use of color pastes and crushed stone, so that a shingle of any desired color or texture can be had, either over the whole upper surface or over only the portion that is exposed to view in the finished assembly, the granular surfacing material conforming approximately to the undulations of the irregular surface. That the shingles are non-inflammable is obvious. The shingles may be relatively thin, for example, 0.14 to 0.18 inch in maximum thickness.

To obtain novel architectural effects from the use of the shingles, the depressions or elevations in the surface of the shingles should be pronounced, that is, substantially more prominent than obtained by pressing the face of a shingle, while the materials therein are in a deformable state, against a piece of canvas or an ordinary wire gauze, for example. As indicated in Fig. 2, the depressions are elongated, preferably not straight or regular and of varying or irregular depth and width. I have found satisfactory pronounced, deep depressions, say of a maximum depth that is approximately a third to a half of the greatest thickness of the shingle or unit. Except for the depressions, the surface of the shingle is approximately plane.

In preparing an embossed plate of grained surface, such as illustrated in Fig. 4, any suitable means may be employed. Thus, flexible metal plates such as tinned iron of dimensions 17 x 17 x 0.011 inches may be passed between a pair of rollers provided with elevations and depressions of such a pattern that the elevations of one roller correspond to the depressions in the other. After the plates are set through such a pair of rollers, the plates may be again passed through, preferably after having been used in one or two hydraulic pressings of shingle segments, in order to increase the irregularities of the elevations and depressions first formed. Rolls that may be used are of the corrugated type conventionally used in making asbestos paper for pipe insulation. Some of the elevations on such rolls may be broken off at intervals, to favor irregularity of corrugations of the metal sheets sent through such rolls. In use, such plates come to have a surface that is approximately plane, except for irregular ridges thereon.

When the flexible metal embossing plates are used first to impress a pattern upon shingle material having one color of surface, and then upon a shingle material having a different color, care may be taken to avoid carrying the first color forward with the used embossing plates onto the first shingles of the different color embossed with the same plates. A convenient method of preventing discoloration of a shingle by an embossing plate that has been used just previously, with a different colored shingle, has been found and is reasonably effective in most cases.

It will be recalled that the assembly which is submitted to hydraulic pressure comprises the craped embossing plate which, on one side, faces a shingle segment and, on the other side, faces a metal plate of plain surface. During the pressing just one side of the embossing plate, therefore, becomes dirty, that is, colored in spots at least with the shingle material. When a differently colored shingle material is to be embossed, this previously used plate is simply placed with the clean side towards the shingle material of the new color, in the stack that is to be hydraulically compressed. During the subsequent compressing, the dirt from the previous pressing, which is now on the back side of the embossing plate, that is, away from the face of the shingle material, becomes loosened by flexing of the plate during the hydraulic compression. When the stack is disassembled, this dirt from the previous pressing operation can usually be dislodged readily. If this procedure is not sufficient to avoid contamination of one shingle by material from the previously pressed material, the plates may be washed, as with a stiff brush and water.

While the use of flexible plates of uneven or craped surface has been described, other types of embossing plates may be used. Thus, there may be used flat rigid plates provided with the desired irregularities of surface. However, the use of flexible embossing plates is the preferred embodiment of the invention. The use of such flexible embossing plates gives certain advantages, in addition to those that have been mentioned, over the use of rigid embossing plates.

Thus, it has been found that, when the embossing plate is stripped from the shingle, after completion of the pressing and the taking of the initial set by the shingle, the stripping is easily done, if the plate is flexible, by gripping and pulling an edge of the embossing plate and thus peeling it from the shingle. Apparently, the flexing of the plate as it is thus peeled from the shingle material allows air to enter between the plate and the surface of the shingle, with consequent destruction of suction between the plate and the shingle. Also, the plate is somewhat distorted in being thus removed and this favors dislodgement of shingle material from depressions in the corrugated plate.

When, on the other hand, a rigid plate is used for the embossing, it is difficult to separate the plate regularly from the compressed shingle. Once this result is observed, various theories may be advanced to explain it. The result may be due to the absence of flexing of the rigid plate and consequent difficulty in breaking the vacuum between the material and the plate, as the plate is separated from the material. However, the rigid plate may be used, if desired, in cases where the partial destruction of the embossed surface of the shingle is not objectionable or where special precautions may be taken to minimize the tendency of the shingle material to adhere to the rigid embossing plate.

As the material of construction of the embossing plates, iron has been used with satisfaction. Iron, suitably tinned iron, is desirable. Also, brass may be used and is very satisfactory aside from the item of initial cost.

For special purposes, other shapes may be impressed upon the surface of a deformable material during densification by pressure. Thus, an embossing plate provided with two series of ridges that cross each other may be used as a substitute for the craped plate in the assembly shown in Fig. 1. Such a cross-ridged plate is illustrated in Fig. 5. It may have more or less parallel ridges 9 and transverse discontinuous ridges 10, also more or less parallel to each other. When such an embossing plate is used in pressing a deformable sheet, there may be produced a cross-grained or grooved shingle such as illustrated in Fig. 6. Such a shingle has a series of grooves 11 and a series of transverse grooves 12, corresponding approximately to the negative of the pattern of the plate illustrated in Fig. 5. When viewed at a distance, the deep cross-grooves in the shingle give more or less the pleasing appearance of a textile surface, particularly if properly colored.

If the more or less square segment first made and hardened is broken along a central line into two shingles, as illustrated in Fig. 6, such a shingle will have longitudinal and also transverse grooves.

Because the cross-ridged sheet, like the craped sheet illustrated in Fig. 3, is continuous, shingle material does not get behind the sheet during the pressing operation, and the sheet may be readily removed, by stripping or pulling, from the pressed shingle.

Also, a grass mat of uneven surface, such as one of sisal, may be used as a substitute for the craped plate in the assembly shown in Fig. 1. Such grass matting may be composed of relatively large warp strands of grass or other fibrous material which are woven together by small thread or twine so that the mat as a whole has a distinct grain running lengthwise of the strands. For use, this matting is cut into sizes conforming to the size of the segment and placed in the assembly, over the plastic sheet of asbestos fiber and Portland cement so that, when the plate is pressed down, the mat is forced into the upper surface of the segment to provide major longitudinal parallel grooves or graining, as well as minor transverse depressions intersecting those that are longitudinal. By the use of such mats in the graining of an asbestos shingle, each shingle differs in its surface appearance from every other shingle, even though the same mat is used, as it is, over and over again, since each time the mat is removed it assumes a new form. An objection to the use of a grass mat is that the mat constitutes a discontinuous embossing member that permits of penetration by material being pressed, with resultant difficulty of removing the mat from the pressed shingle without partly destroying the face thereof.

A pitted, as well as a rigged or corrugated, surface may be given to the shingle. Thus, a granular, resilient material, such as rubber, that is readily removable from the densified segment, may be spread over the upper surface of the segment before it is placed in the assembly illustrated in Fig. 1. The usual densification is then made. After the densified sheets are hardened, say, after the cement therein has taken its final set, the granular, resilient material is removed from the surface, as by means of a stiff brush.

It will be understood that the pattern of an irregular surface, such as that of a ridged metal sheet, may be impressed upon a deformable composition by other means than those illustrated in which there is hydraulic compression and impression of an irregular surface upon a plurality of segments simultaneously. Thus a deformable composition containing Portland cement, asbestos fibers, and water, may be placed in the bottom of a mold, with smooth sides and bottom, and covered with a craped plate. Pressure may then be applied to the craped plate. After the composition has taken an initial set, it is removed from the mold, separated from the plate and finished in a usual manner.

Since the details that have been given are for the purpose of illustration and not restriction of the invention, it is intended that the invention should be limited only by the terms of the claim interpreted as broadly as consistent with novelty over the prior art.

What I claim is:

In making a structural unit, the method which comprises forming a wet crumbly sheet including Portland cement and reenforcing fibres distributed therethroughout, pressing strongly against a face of the sheet a flexible irregularly surfaced plate adapted to be appreciably flattened, resiliently, by the pressing operation, releasing the pressure, removing the said plate from the impressed material, and then hardening the cement therein.

WALTER McQUADE.